(12) United States Patent
Rysgaard

(10) Patent No.: US 8,463,265 B2
(45) Date of Patent: Jun. 11, 2013

(54) MOBILE COMMUNICATION TERMINAL AND METHOD FOR REGISTERING A MOBILE COMMUNICATION TERMINAL IN A COMMUNICATION NETWORK

(75) Inventor: Bent Henneberg Rysgaard, Aalborg Ø (DK)

(73) Assignee: Intel Mobile Communications GmbH, Neubiberg (DE)

( * ) Notice: Subject to any disclaimer, the term of this patent is extended or adjusted under 35 U.S.C. 154(b) by 164 days.

(21) Appl. No.: 13/040,286

(22) Filed: Mar. 4, 2011

(65) Prior Publication Data

US 2012/0225651 A1  Sep. 6, 2012

(51) Int. Cl.
*H04W 8/02* (2009.01)
(52) U.S. Cl.
USPC ..... 455/435.1; 455/418; 455/434; 455/422.1; 455/432.3; 455/552.1; 370/337; 370/347; 370/330; 370/352; 370/310
(58) Field of Classification Search
USPC . 455/435.1, 418, 434, 422.1, 552.1; 370/337, 370/347, 330, 352, 310
See application file for complete search history.

(56) References Cited

U.S. PATENT DOCUMENTS

| 6,185,436 | B1 | 2/2001 | Vu | |
|---|---|---|---|---|
| 2010/0216465 | A1* | 8/2010 | Mubarek et al. | 455/435.1 |
| 2012/0149351 | A1* | 6/2012 | Kalbag | 455/418 |

FOREIGN PATENT DOCUMENTS

| CN | 101247596 A | 8/2008 |
|---|---|---|
| EP | 1173037 A2 | 1/2002 |
| EP | 1617694 A1 | 1/2006 |
| EP | 1942695 B1 | 5/2012 |
| GB | 2439370 A | 12/2007 |

OTHER PUBLICATIONS

3GPP TS 31.102 V6.1.0 (Mar. 2003) 3rd Generation Partnership Project; Technical Specification Group Terminals; Characteristics of the USIM Application (Release 6); pp. 1-146.
3GPP TS 23.122 V6.5.0 (Jun. 2005) 3rd Generation Partnership Project; Technical Specification Group Core Network and Terminals; Non-Access-Stratum (NAS) functions related to Mobile Station (MS) in idle mode (Release 6); pp. 1-34.

* cited by examiner

*Primary Examiner* — Kiet Doan
*Assistant Examiner* — Michael T Vu

(57) ABSTRACT

A mobile communication terminal is described comprising a first identity module; a second identity module; a detector configured to detect whether the mobile communication terminal is in a coverage area of a reference mobile communication network of the first identity module; and a controller, configured to, if it has been detected that the mobile communication terminal is not within the coverage area of the reference mobile communication network of the first identity module, determine a reference mobile communication network of the second identity module, and to start a registering process for registering the first identity module with the reference mobile communication network of the second identity module.

13 Claims, 4 Drawing Sheets

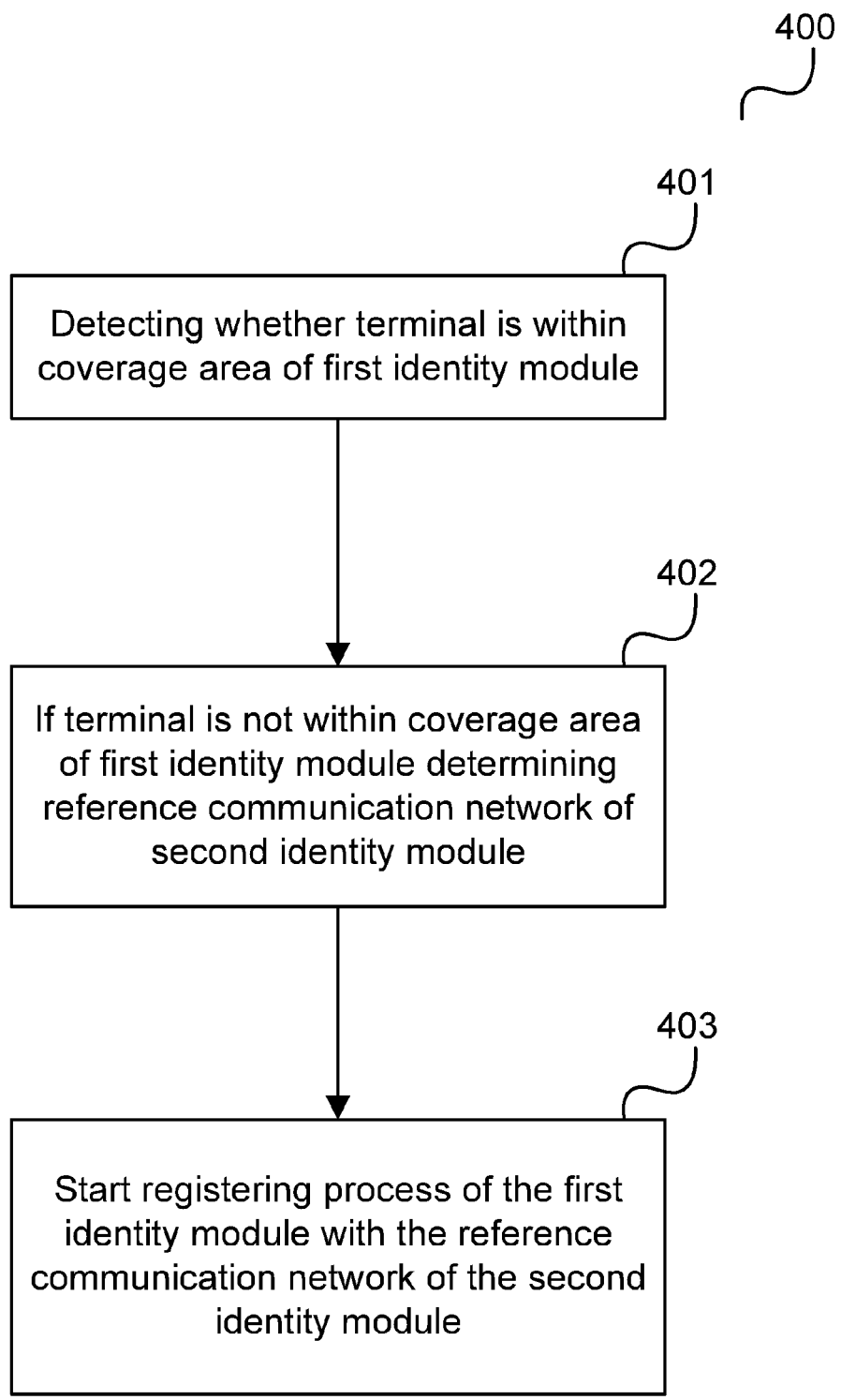

MOBILE COMMUNICATION TERMINAL AND METHOD FOR REGISTERING A MOBILE COMMUNICATION TERMINAL IN A COMMUNICATION NETWORK

TECHNICAL FIELD

Embodiments generally relate to a mobile communication terminal and a method for registering a mobile communication terminal in a communication network

BACKGROUND

A mobile communication terminal may support the possibility to have more than one identity module, e.g. more than one SIM (Subscriber Identity Module), at a time. To allow communication, each identity module needs to register with a communication network. Efficient methods to select the communication networks with which the identity modules register, e.g. with regard to the achieved service quality, are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIG. 4 shows a flow diagram according to an embodiment.

DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Figure 1:
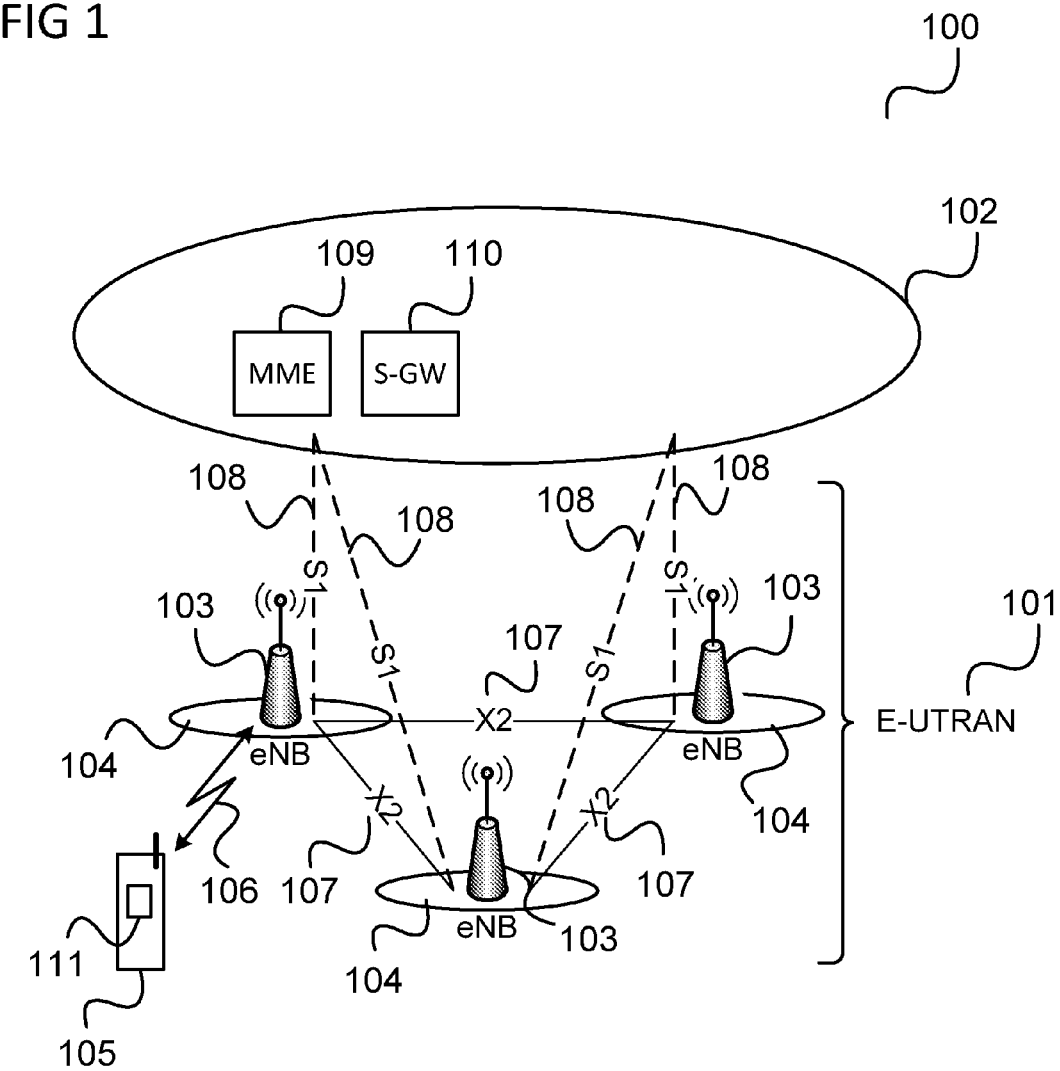
FIG. 1 shows a communication system according to an embodiment.

FIG. 1 shows a communication system 100 according to an embodiment.

The communication system 100 includes a radio access network (e.g. an E-UTRAN, Evolved UMTS (Universal Mobile Communications System) Terrestrial Radio Access Network according to LTE (Long Term Evolution)) 101 and a core network (e.g. an EPC, Evolved Packet Core, according LTE) 102. The radio access network 101 may include base (transceiver) stations (e.g. eNodeBs, eNBs, according to LTE) 103. Each base station 103 provides radio coverage for one or more mobile radio cells 104 of the radio access network 101. According to one embodiment, the communication system 100 is a communication system according to GSM (Global System for Mobile Communications).

A mobile terminal (also referred to as UE, user equipment, or MS, mobile station) 105 located in a mobile radio cell 104 may communicate with the core network 102 and with other mobile terminals 105 via the base station providing coverage in (in other words operating) the mobile radio cell.

Control and user data are transmitted between a base station 103 and a mobile terminal 105 located in the mobile radio cell 104 operated by the base station 103 over the air interface 106 on the basis of a multiple access method.

The base stations 103 are interconnected with each other by means of a first interface 107, e.g. an X2 interface. The base stations 103 are also connected by means of a second interface 108, e.g. an S1 interface, to the core network, e.g. to an MME (Mobility Management Entity) 109, and a Serving Gateway (S-GW) 110. For example, the MME 109 is responsible for controlling the mobility of mobile terminals located in the coverage area of E-UTRAN, while the S-GW 110 is responsible for handling the transmission of user data between mobile terminals 105 and core network 102.

The radio access network 101 and the core network may support communication according to various communication technologies, e.g. mobile communication standards. For example, each base station 103 may provide a radio communication connection via the air interface between itself and the mobile terminal 105 according to LTE, UMTS, GSM (Global System for Mobile Communications), EDGE (Enhanced Data Rates for GSM Evolution) radio access. Accordingly, the radio access network 102 may operate as an E-UTRAN, a UTRAN, a GSM radio access network, or a GERAN (GSM EDGE Radio Access Network). Analogously, the core network 102 may include the functionality of an EPC, a UMTS core network or a GSM core network.

The mobile terminal 105 may include an identity module 111 (e.g. implemented by a chip card) that allows the mobile terminal 105 to identify itself as a subscriber of the communication network formed by the radio access network 101 and the core network 102 and thus use the communication network as a home network. The identity module 111 is for example a SIM (Subscriber Identity Module) in case the communication network is a GSM communication network or a USIM in case the communication network is a UMTS communication network.

In practice, a plurality of communication networks including a radio access network 101 and a core network 102 as described above are provided by different operators such that the coverage areas of the communication networks overlap, i.e. a mobile terminal may be located within a radio cell 104 operated by a base station 103 belonging to a first communication network of a first operator and at the same time be located within a radio cell 104 operated by a base station 103 belonging to a second communication network of a second operator.

Figure 2:
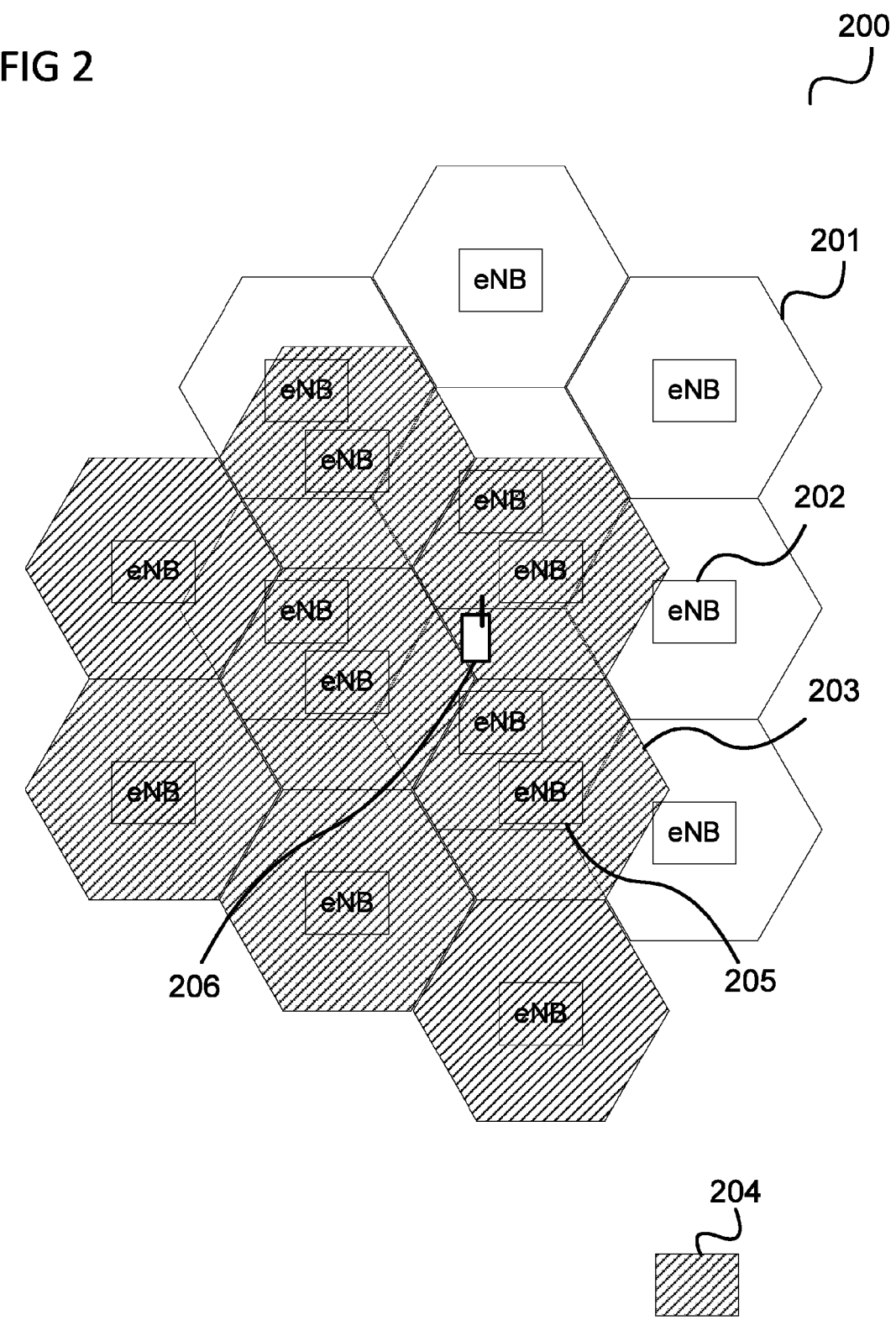
FIG. 2 shows a radio cell arrangement according to an embodiment.

This is illustrated in FIG. 2.

FIG. 2 shows a radio cell arrangement 200 according to an embodiment.

The radio cell arrangement 200 includes a first plurality of radio cells 201 (shown without hatching) operated by a plurality of first base stations 202 of a first communication network, and a second plurality of radio cells 203 indicated by a hatching 204 operated by a plurality of second base stations 205 of a second communication network.

As illustrated, the second plurality of radio cells 203 overlaps the first plurality of radio cells 204 such that a mobile terminal 206 located in the overlapping area may connect to both the first communication network and the second communication network, e.g. may both register with a base station 202 of the first communication network and a base station 205 of the second communication network.

For being able to use both the first communication network and the second communication network as home networks (and not being forced to roam in case the mobile terminal 206 is located in the coverage area of only one of the communication networks and having only an identity module of the other communication network), the mobile terminal 206 may include two identity modules. This is illustrated in FIG. 3.

Figure 3:
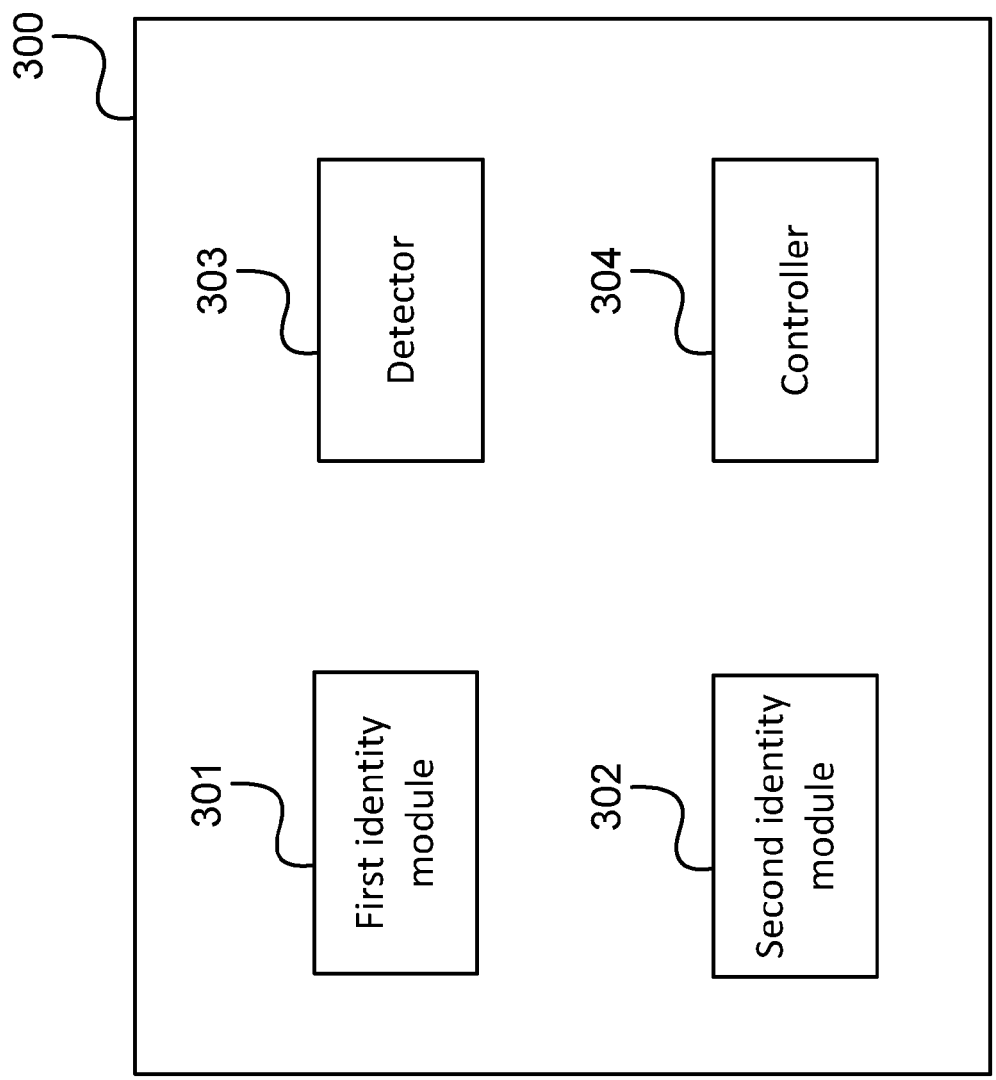
FIG. 3 shows a mobile communication terminal according to an embodiment.

FIG. 3 shows a mobile communication terminal 300 according to an embodiment.

The mobile communication terminal 300 includes a first identity module 301 and a second identity module 302.

The first identity module 301 is for example associated with a first communication network and the second identity module 302 is for example associated with a second communication network. In other words, for example, the first communication network is a home communication network for the first identity module 301 (and thus for the mobile communication terminal 300) and the second communication network is a home communication network for the second identity module 301 (and thus for the mobile communication terminal 300).

In one embodiment, the mobile communication terminal 300 only includes one radio frequency module and/or only one baseband module that is suitable for communicating with the first communication network and the second communication network.

In this case, when the mobile communication terminal 300 communicates with the first communication network (e.g. uses a service provided by a radio cell 201 of the first communication network) and, at the same time, communicates with the second communication network (e.g. uses a service provided by a radio cell 203 of the second communication network), the mobile communication terminal 300 needs to do some sort of time multiplexing between the radio cells 201, 203. The parallel usage of both services may even be not possible if the necessary data communication of the services overlaps in time.

This may for example result in the loss of incoming calls. In good reception conditions, measures can be taken to overcome this but in case the radio conditions are not good enough, incoming calls may be lost in case that there are timing conflicts between the paging channels of the radio cells 201, 203 (e.g. the reception time slots of the paging channels overlap in time).

Further, an issue regarding power usage may arise. When being registered with both a radio cell 201 of the first communication network and a radio cell 203 of the second communication network, the mobile communication terminal 300 typically has to listen for radio cell configuration information, carry out neighboring cell measurements, etc. twice as often and thus has to spend twice as much power on these activities compared to a mobile communication terminal including only one identity module.

This may be overcome by having both identity modules 301, 302 register with the same communication network or radio cell. This may however not be possible or at least not be desirable if the first identity module 301 and the second identity module 302 have different home networks, e.g. HPLMNs (Home Public Land Mobile Networks) or EHPLMNs (Equivalent PLMNs) and the mobile communication terminal 300 is located in the coverage area of the home network of the first identity module 301 and in the coverage area of the home network of the second identity module 302. Otherwise, however, according to one embodiment, it is tried to achieve that both identity modules 301, 302 register with the same communication network or radio cell. It should however be noted that there may be requirements of the communication standard used (e.g. a 3GPP (Third Generation Partnership Project) specification) that might be violated if two identity modules are made to register with the same radio cell.

It should further be noted that when the two identity modules 301, 302 use radio cells of different communication networks, the case may be that these two radio cells are badly aligned because the operators of the different communication networks may not be interested to cooperate in such matters. Thus, the radio cells may be poorly aligned regarding timing and frequency usage which may be difficult to handle for the mobile communication terminal if the misalignment is out of bound (e.g. from a communication standard, e.g. a 3GPP standard, perspective).

According to one embodiment, the mobile communication terminal 300 includes a detector 303 configured to detect whether the mobile communication terminal 300 is in a coverage area of a reference mobile communication network of the first identity module.

Further, according to one embodiment, the mobile communication terminal 300 includes a controller 304, configured to, if it has been detected that the mobile communication terminal is not within the coverage area of the reference mobile communication network of the first identity module, determine a reference mobile communication network of the second identity module, and to start a registering process for registering the first identity module with the reference mobile communication network of the second identity module. It should be noted that if a mobile communication terminal includes two (or more) identity modules, any of the identity modules may assume the role of the first identity module according to the above while the other may assume the role of the second identity module according to the above.

In other words, according to one embodiment, when the mobile communication terminal 300 is not within the coverage area of a communication network associated with the first identity module 301 (e.g. a home communication network or an equivalent home communication network of the first identity module 301) a reference communication network of the second identity module 302 (e.g. a home communication network or an equivalent home communication network of the second identity module 301 or also a communication network in which the second identity module 302 is registered) is determined and it is tried to register the first identity module 301 with the reference communication network of the second identity module 302. In other words, according to one embodiment, it is checked whether the roaming identity module (the first identity module 301 in the above example) can be served by the (equivalent) home communication network of the second identity module 302 and thus by the same communication network as the non-roaming identity module (assuming that the mobile communication terminal 300 is actually in the coverage area of the (equivalent) home communication network of the second identity module 302).

It should be noted that the mobile communication terminal 300 may not only include two identity modules (e.g. is a dual-SIM device) but may also include more than two identity modules (e.g. may be a multi-SIM device). For example, in case of more than two identity modules, the mobile communication terminal 300 operates with regard to two (e.g. with regard to any two) of the identity modules as explained above for two identity modules.

Selecting a communication network for a identity module 301, 302 to register with may also be seen as choosing a serving network for the identity module 301, 302. An identity module 301, 302 is for example a module (e.g. implemented by a smart card, e.g. using software running on the smart card)

storing a service-subscriber key (e.g. an International Mobile Subscriber Identity (IMSI)) that may be used to identify the mobile communication terminal 300 (or its user) as a subscriber of a communication network (e.g. the home communication network of the identity module).

Starting the registering process may include determining whether the mobile communication terminal is within a coverage area of the reference mobile communication network of the second identity module.

According to one embodiment, starting the registering process includes determining whether the first identity module is allowed to be registered with the reference mobile communication network of the second identity module.

According to one embodiment, determining whether the first identity module is allowed to be registered with the reference mobile communication network of the second identity module includes determining at least one of whether an operator of the reference mobile communication network of the second identity module agrees to the first identity module being registered with the reference mobile communication network of the second identity module, whether an operator of the reference mobile communication network of the first identity module agrees to the first identity module being registered with the reference mobile communication network of the second identity module, and whether a user of the mobile communication terminal agrees to the first identity module being registered with the reference mobile communication network of the second identity module.

The controller is for example configured to register the first identity module with the reference mobile communication network of the second identity module if the first identity module is allowed to be registered with the reference mobile communication network of the second identity module.

The mobile communication terminal may further include a display, wherein the controller is configured to control the display to present to the user of the mobile communication terminal the option of registering the first identity module with the reference mobile communication network of the second identity module.

According to one embodiment, the controller is configured to control the display to present to the user of the mobile communication terminal the option of registering the first identity module with the reference mobile communication network of the second identity module if the mobile communication terminal is not within a coverage area of the reference mobile communication network of the first identity module and is within a coverage area of the reference mobile communication network of the second identity module.

The mobile communication terminal may further include an input circuit configured to receive an input from the user, and the controller may be configured to register the first identity module with the reference mobile communication network of the second identity module if the input circuit receives from the user an input indicating that the user agrees to the option of registering the first identity module with the reference mobile communication network of the second identity module.

According to one embodiment, the reference mobile communication network of the second identity module is a home communication network of the second identity module, an equivalent home communication network of the second identity module, or a communication network with which the second identity module is registered, e.g. a communication network with which the second identity module is currently registered, e.g. a serving communication network of the second identity module that is for example not the home communication network or an equivalent home communication network of the second identity module.

The reference mobile communication network of the first identity module is for example a home communication network of the first identity module or an equivalent home communication network of the first identity module.

The mobile communication terminal may further include a first integrated circuit card (e.g. a smart card such as a Universal Integrated Circuit Card) implementing the first identity module.

The mobile communication terminal may further include a second integrated circuit card (e.g. a smart card such as a Universal Integrated Circuit Card) implementing the second identity module.

According to one embodiment, the reference mobile communication network of the first identity module and the reference mobile communication network of the second identity module are cellular mobile communication networks, e.g. mobile communication networks according to LTE, UMTS, GSM (Global System for Mobile Communications), EDGE (Enhanced Data Rates for GSM Evolution) radio access, CDMA2000 (CDMA: Code Division Multiple Access) or FOMA (Freedom Of Mobile Access).

According to one embodiment, the mobile communication terminal supports communication with only one of the reference mobile communication of the first identity module and the reference mobile communication network of the second identity module at a time. For example, the mobile communication terminal only includes one modem/base band circuit combination that allows communicating with a mobile communication network (e.g. a wide-area mobile communication network) such as the reference mobile communication of the first identity module and the reference mobile communication network of the second identity module. Or, as another example, the mobile communication terminal includes two modems (e.g. for different radio technologies) but only one baseband circuit, such that it may only communicate with one mobile communication network at a time.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

According to one embodiment, the communication terminal 300 carries out a method as illustrated in FIG. 4.

FIG. 4 shows a flow diagram 400 according to an embodiment.

The flow diagram 400 illustrates a method for registering a mobile communication terminal in a communication network.

In 401, it is detected whether the mobile communication terminal is in a coverage area of a reference mobile communication network of a first identity module of the communication terminal.

In 402, a reference mobile communication network of a second identity module of the mobile communication terminal is determined if it has been detected that the mobile communication terminal is not within the coverage area of the reference mobile communication network of the first identity module.

In 403, a registering process for registering the first identity module with the reference mobile communication network of the second identity module is started.

It should be noted that embodiments described in context with the mobile communication terminal are analogously valid for the a method for registering a mobile communication terminal in a communication network and vice versa.

According to one embodiment, a full communication network (e.g. PLMN) selection for the first identity module 301 is carried out by the mobile communication terminal 300 in automatic or manual mode and the user of the mobile communication terminal 300 may "optimize" the selection, e.g. is presented with a suggestion (e.g. the home network of the second identity module 302) and may confirm the suggestion. This may be seen as a manual selection that would for example be allowed according to the 3GPP communication standard.

According to one embodiment, the communication network selection for the first identity module 301 is done automatically (e.g. the controller 304 is configured to do the communication network selection) by manipulating a user controlled PLMN selector list i.e. a list of communication networks by the user, for example including a ranking (i.e. a prioritization) of the communication networks. For example, according to one embodiment, the controller 304 puts the home communication network of the second identity module 302 into the list as the communication network with highest priority. This manipulation of the list may be indicated to the user or the user may be involved in the communication network selection (e.g. may be asked to confirm a communication network selection) such that this may be in accordance with the 3GPP standard.

According to one embodiment, if the home communication network of the second identity module 302 is not on a list of allowed communication networks of the operator of the home communication network of the first identity module 301 (e.g. an operator controlled PLMN selector list) and the mobile communication terminal 300 is in the coverage area of another communication network that is on the operator's list of allowed communication networks, the first identity module 301 is not registered with the home communication network of the second identity module 302 (e.g. the registration of the first identity module 301 with the home communication network of the second identity module 302 is denied) and the first identity module 301 is for example registered with the other communication network. A list of possible communication networks of the first identity module 301 that may be established based on user selection, operator selection, quality measurements etc. (e.g. generated according to a prioritized PLMN list generation process according to 3GPP) may be checked to see whether it includes the home communication network of the second identity module 302, e.g. to determine whether the home communication network of the second identity module 302 is acceptable for the user and the operator.

According to one embodiment, a user selection is not taken into account and/or the operator's list of allowed communication networks are not taken into account and the registration process involves (actively) trying to register the first identity module 301 with the home communication network of the second identity module 302.

Further, according to the embodiment, a combination of the above approaches may be used.

In the following, examples for the communication network selection for the identity modules 301, 302 of the mobile communication terminal 300 are given.

Example 1

It is assumed that the mobile communication terminal 300 is in the coverage area of
- PLMN 1, operated by "Telenor", received by the mobile communication terminal 300 with a signal strength given by a RRSI (Received Signal Strength Indication) of 20
- PLMN 2, operated by "3", received by the mobile communication terminal 300 with a signal strength given by a RRSI of 40
- PLMN 3, operated by "TDC", received by the mobile communication terminal 300 with a signal strength given by a RRSI of 10

In this example, it is assumed that the first identity module 301 is an identity module of the network operator "China Mobile" and that the second identity module 302 is an identity module of the network operator "Telenor". It is further assumed that none of the communication networks PLMN 1, PLMN 2, and PLMN 3 is an equivalent home communication network for the first identity module 301 (i.e. for "China Mobile").

When the mobile communication terminal 300 is switched on and boots it does not find a home communication network for the first identity module 301 but finds PLMN 1 as the home communication network for the second identity module 302. According to one embodiment, the mobile communication terminal presents the option to use PLMN 1 as the roaming network for the first identity module 301 to the user, e.g. as the communication network that presents the best service.

Example 2

It is assumed that the mobile communication terminal 300 is in the coverage area of
- PLMN 1, operated by "Telenor", received by the mobile communication terminal 300 with a signal strength given by a RRSI of 20
- PLMN 2, operated by "3", received by the mobile communication terminal 300 with a signal strength given by a RRSI of 40
- PLMN 3, operated by "TDC", received by the mobile communication terminal 300 with a signal strength given by a RRSI of 10

In this example, it is assumed that the first identity module 301 is an identity module of the network operator "Vodafone" and that the second identity module 302 is an identity module of the network operator "Telenor". It is further assumed that the communication network PLMN 3 is an equivalent home communication network for the first identity module 301 (i.e. for "Vodafone").

When the mobile communication terminal 300 is switched on and boots it does not find a home communication network for the first identity module 301 but finds PLMN 1 as the home communication network for the second identity module 302.

The mobile communication terminal 300 finds PLMN 3 as equivalent communication network for the first identity module 301, e.g. based on information stored in the first identity module 301 and selects PLMN 3 as its intended serving network. By that, it conforms with the 3GPP standard. Nevertheless, the user of the mobile communication terminal 300 is informed about this selection and is presented with the option to select PLMN 1 (i.e. the home communication network of the second identity module 302) as serving network for the first identity module 301 (i.e. is presented with the option to register the second identity module 302 with PLMN 1). If the user decides to use PLMN 1 as serving network for the first identity module 301, the mobile communication terminal 300 tries to register the first identity module 301 with PLMN 1. In case the registering is successful, the mobile communication terminal 300 stays with PLMN 1 for the first identity module 301. Otherwise, the mobile communication terminal 300 registers the first identity module 301 with PLMN 3.

Example 3

It is assumed that the mobile communication terminal 300 is in the coverage area of
PLMN 1, operated by "Telenor", received by the mobile communication terminal 300 with a signal strength given by a RRSI of 20
PLMN 2, operated by "3", received by the mobile communication terminal 300 with a signal strength given by a RRSI of 40
PLMN 3, operated by "TDC", received by the mobile communication terminal 300 with a signal strength given by a RRSI of 5

In this example, it is assumed that the first identity module 301 is an identity module of the network operator "Vodafone" and that the second identity module 302 is an identity module of the network operator "Telenor". It is further assumed that the communication network PLMN 3 is an equivalent home communication network for the first identity module 301 (i.e. for "Vodafone").

When the mobile communication terminal 300 is switched on and boots it does not find a home communication network for the first identity module 301 but finds PLMN 1 as the home communication network for the second identity module 302.

The mobile communication terminal 300 finds PLMN 3 as equivalent communication network for the first identity module 301, e.g. based on information stored in the first identity module 301 and selects PLMN 3 as its intended serving network. By that, it conforms with the 3GPP standard.

The mobile communication terminal 300 tries to register the first identity module 301 with PLMN but is not successful due to low reception quality (i.e. the mobile communication terminal 300 may be regarded to be outside the coverage area of PLMN 3).

The user of the mobile communication terminal 300 is presented with the option to select PLMN 1 (i.e. the home communication network of the second identity module 302) as serving network for the first identity module 301 (i.e. is presented with the option to register the second identity module 302 with PLMN 1) although PLMN 2 has higher reception quality. If the user decides to use PLMN 1 as serving network for the first identity module 301, the mobile communication terminal 300 tries to register the first identity module 301 with PLMN 1. In case the registering is successful, the mobile communication terminal 300 stays with PLMN 1 for the first identity module 301. Otherwise, the mobile communication terminal 300 may for example keep trying registering the first identity module 301 with PLMN 3 or, alternatively register the first identity module 301 with PLMN 2.

Example 4

It is assumed that the mobile communication terminal 300 is in the coverage area of
PLMN 1, operated by "Telenor", received by the mobile communication terminal 300 with a signal strength given by a RRSI varying between 38 and 40
PLMN 2, operated by "3", received by the mobile communication terminal 300 with a signal strength given by a RRSI varying between 38 and 40
PLMN 3, operated by "TDC", received by the mobile communication terminal 300 with a signal strength given by a RRSI of 5

In this example, it is assumed that the first identity module 301 is an identity module of the network operator "China Unicom" and that the second identity module 302 is an identity module of the network operator "China Mobile". It is further assumed that none of the communication networks PLMN1, PLMN 2, and PLMN 3 is an equivalent home communication network for the first identity module 301 (i.e. for "China Unicom") or for the second identity module 302 (i.e. for "China Mobile").

When the mobile communication terminal 300 is switched on and boots it does not find a home communication network or an equivalent home communication network for the first identity module 301 and does not find a home communication network or an equivalent home communication network for the second identity module 302.

According to one embodiment, the mobile communication terminal 300 tries to register the identity module 301, 302 that is first coming to this stage in the selection procedure, e.g. the second identity module 302 in this example, to register with the PLMN with the best reception quality, which is for example PLMN 2 at this point in time.

It is further assumed that when reception quality is measured in course of the selection procedure for the first identity module 301, that the RSSI of PLMN 1 is higher than the RSSI of PLMN 2. Thus, PLMN 1 could be selected for the for the first identity module 301 but nevertheless, according to one embodiment, the user is presented with the option to select PLMN 2 for the first identity module 301, e.g. as the communication network providing the best service.

One embodiment may be seen to utilize the possibilities according to the 3GPP standard (e.g. user selection of a PLMN to be used) to enhance the user experience using a dual-SIM (or generally a dual identity module) mobile communication terminal when at least one of the identity modules has to roam. This may be done by following the 3GPP specifications regarding PLMN selection, i.e. without violating the standard. Specifically, according to one embodiment, the user is presented with options to optimize the PLMN selection. This can be seen as a manual selection. Thus, the 3GPP specifications regarding PLMN selection can be seen to be not violated. According to one embodiment, an algorithm or a process is provided to help the user in the PLMN selection thus making it easier for the user to make the choice that gives the best user experience.

The implementation of the PLMN selection may be implemented in various ways. For example, the two identity modules 301, 302 may be handled as having two protocol stacks in the same device and thus having two mobility management (MM) functionalities and entities each performing communication network selection for one identity module 301, 302. In that case, the PLMN selection processes for the two identity modules 301, 302 may be carried out independently from each other until both mobility management entities have obtained a list of available communication networks in the PLMN selection, e.g. using a background PLMN search. According to one embodiment, when a first mobility management entity of the mobility management entities has selected a communication network, it may inform the other (i.e. the second) mobility management entity about the result of the selection and the second mobility management entity has the option to select the same communication network. If the second mobility management entity does not select the same communication network, it may select a communication network and inform the first mobility management entity about the result of the selection. The first mobility management entity may then reconsider its communication selection, e.g. with user interaction.

The mobility management entities may share information (such as an absolute radio frequency channel number (ARFCN), system information, etc.) to help each other with registering with (or camping on) a radio cell. This may for example be used if the first mobility management entity reconsiders and selects the same communication network as the second mobility management entity.

According to other embodiments, similar functionalities are implemented using only one mobility management entity (handling both identity modules 301, 302) or having a master-slave relation between the two mobility management entities etc.

It should be noted that by both identity modules 301, 302 using the same communication network as serving network (i.e. registering with the same communication network) timing conflicts between paging messages of the two identity modules 301, 302 can be avoided and thus call drops resulting of such timing conflicts can be avoided. Further, power may be saved compared to the usage of two different communication networks as the mobile communication terminal 300 only needs to read system information from only one communication network. Additionally, their is no risk of losing a service (e.g. interruption of a communication connection) between the mobile communication terminal 300 and one of two communication networks due to a large frequency offset between the communication networks.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A mobile communication terminal comprising
a first identity module;
a second identity module;
a detector configured to detect whether the mobile communication terminal is in a coverage area of a reference mobile communication network of the first identity module;
a controller, configured to, if it has been detected that the mobile communication terminal is not within the coverage area of the reference mobile communication network of the first identity module, determine a reference mobile communication network of the second identity module, and to start a registering process for registering the first identity module with the reference mobile communication network of the second identity module, wherein starting the registering process comprises determining whether the first identity module is allowed to be registered with the reference mobile communication network of the second identity module,
wherein determining whether the first identity module is allowed to be registered with the reference mobile communication network of the second identity module comprises determining at least one of whether an operator of the reference mobile communication network of the second identity module agrees to the first identity module being registered with the reference mobile communication network of the second identity module, whether an operator of the reference mobile communication network of the first identity module agrees to the first identity module being registered with the reference mobile communication network of the second identity module, and whether a user of the mobile communication terminal agrees to the first identity module being registered with the reference mobile communication network of the second identity module.

2. The mobile communication terminal according to claim 1, wherein starting the registering process comprises determining whether the mobile communication terminal is within a coverage area of the reference mobile communication network of the second identity module.

3. The mobile communication terminal according to claim 1, wherein the controller is configured to register the first identity module with the reference mobile communication network of the second identity module if the first identity module is allowed to be registered with the reference mobile communication network of the second identity module.

4. The mobile communication terminal according to claim 1, further comprising a display, wherein the controller is configured to control the display to present to the user of the mobile communication terminal the option of registering the first identity module with the reference mobile communication network of the second identity module.

5. The mobile communication terminal according to claim 4, wherein the controller is configured to control the display to present to the user of the mobile communication terminal the option of registering the first identity module with the reference mobile communication network of the second identity module if the mobile communication terminal is not within a coverage area of the reference mobile communication network of the first identity module and is within a coverage area of the reference mobile communication network of the second identity module.

6. The mobile communication terminal according to claim 1, further comprising an input circuit configured to receive an input from the user, wherein the controller is configured to register the first identity module with the reference mobile communication network of the second identity module if the input circuit receives from the user an input indicating that the user agrees to the option of registering the first identity module with the reference mobile communication network of the second identity module.

7. The mobile communication terminal according to claim 1, wherein the reference mobile communication network of the second identity module is a home communication network of the second identity module, an equivalent home communication network of the second identity module, or a communication network with which the second identity module is registered.

8. The mobile communication terminal according to claim 1, wherein the reference mobile communication network of the first identity module is a home communication network of the first identity module or an equivalent home communication network of the first identity module.

9. The mobile communication terminal according to claim 1, further comprising a first integrated circuit card implementing the first identity module.

10. The mobile communication terminal according to claim 1, further comprising a second integrated circuit card implementing the second identity module.

11. The mobile communication terminal according to claim 1, wherein the reference mobile communication network of the first identity module and the reference mobile communication network of the second identity module are cellular mobile communication networks.

12. The mobile communication terminal according to claim 1, wherein the mobile communication terminal supports communication with only one of the reference mobile communication of the first identity module and the reference mobile communication network of the second identity module at a time.

13. A method for registering a mobile communication terminal in a communication network, the method comprising
   detecting whether the mobile communication terminal is in a coverage area of a reference mobile communication network of a first identity module of the communication terminal;
   determining, if it has been detected that the mobile communication terminal is not within the coverage area of the reference mobile communication network of the first identity module, a reference mobile communication network of a second identity module of the mobile communication terminal; and
   starting a registering process for registering the first identity module with the reference mobile communication network of the second identity module,
   wherein starting the registering process comprises determining whether the first identity module is allowed to be registered with the reference mobile communication network of the second identity module,
   wherein determining whether the first identity module is allowed to be registered with the reference mobile communication network of the second identity module comprises determining at least one of whether an operator of the reference mobile communication network of the second identity module agrees to the first identity module being registered with the reference mobile communication network of the second identity module, whether an operator of the reference mobile communication network of the first identity module agrees to the first identity module being registered with the reference mobile communication network of the second identity module, and whether a user of the mobile communication terminal agrees to the first identity module being registered with the reference mobile communication network of the second identity module.

* * * * *